United States Patent Office 3,039,479
Patented June 19, 1962

3,039,479
HYDRAULIC DILUTING CIRCUIT
Oliver R. Etheridge, Decatur, Ill., assignor to A. E. Staley Manufacturing Company, Decatur, Ill., a corporation of Delaware
Filed Sept. 8, 1959, Ser. No. 838,789
2 Claims. (Cl. 137—3)

This invention relates generally to hydraulic circuit means and associated method for diluting a liquid suspension of solid particles (e.g., a slurry of starch and water) with a selected volume ratio of diluting liquid (e.g., water) and discharging a constant flow of diluted suspension. More particularly, but without limitation thereby, it relates to hydraulic circuit means and associated method for diluting a liquid suspension of solid particles wherein the density of the suspending liquid medium is substantially different from that of the solid particles.

United States Patent 2,871,146 discloses hydraulic circuit means and method for controllably and continuously diluting an aqueous starch slurry with water. Referring to FIG. 2 of this patent, it will be noted (1) that the flow of diluted starch slurry to the starch cooker is regulated by valve 71 through which the incoming diluting water flows, (2) that the flow of concentrated starch slurry in the other branch of the diluting circuit is measured by a flowmeter 55, (3) that the concentrated starch slurry passes through a flow regulating valve 61 and a flow restricting orifice 63 before it joins the diluting water at junction 64, and (4) that the two flow or pressure regulating valves 61 and 71 are spring-loaded.

Although the disclosed method of using the foregoing patented hydraulic diluting circuit is quite satisfactory for liquid suspensions of solid particles under certain operating conditions, it has the following inherent drawback. As the concentration of suspended solid material in the output stream is reduced, without altering the output flow or concentration of stock suspension, the flow of the latter becomes so small that the solid particles may agglomerate either by settling or rising. This behavior of the solid particles interferes with the operation of one or more three important elements in the hydraulic circuit branch carrying the concentrated suspension, e.g., the flowmeter 55, pressure regulating valve 61, and orifice 63 in FIG. 2 of United States Patent 2,871,146.

A disadvantage of the United States Patent 2,871,146 hydraulic diluting circuit as an apparatus is the inherent non-uniform performances of the spring-loaded pressure regulating valves. Conventional valves of this type are equipped with a short spring, which permits construction of a compact economical valve. The performance of the valve is related directly to the variation in valve port opening obtained by movement of the valve member relative to its seat. Movement of the valve member changes the length of the spring. Ideally, the pressure on the upper side of the diaphragm contributed by the spring should be constant and independent of working changes in spring length. If it is, the output flow of the circuit is independent of pressure fluctuations. If the spring pressure is not constant over working changes in its length, then the output flow of the circuit varies with the spring pressure. The spring pressure of the conventional spring-loaded pressure regulating valves varies appreciably over the working range of change in spring length, and hence the circuit flow is not truly independent of pressure fluctuations.

The present invention involves both method and apparatus innovations as will be set forth in the following description and accompanying drawings.

An object of the invention is the provision of an improved hydraulic circuit means for diluting a liquid suspension of solid particles with a selected volume ratio of diluting liquid and discharging a constant flow of diluted suspension.

Another object of the invention is the provision of an improved method of using hydraulic circuit means to dilute a liquid suspension of solid particles with a selected volume ratio of a diluting liquid and discharging a constant flow of diluted suspension.

An additional object of the invention is to prevent fouling and clogging of restricted passages in the foregoing hydraulic diluting circuits with solid particles of the concentrated suspension. A further object of the invention is to permit a full range of solids in the discharged diluted suspension, from zero to maximum value, without leading to fouling or clogging of restricted passages in the diluting circuit due to settling out or using of solid particles at low flows of concentrated suspension.

Other objects of the invention will, in part, be obvious and will, in part, appear hereinafter.

For a more complete understanding of the nature and scope of the invention, reference is made to the following detailed description thereof, including the accompanying drawings, wherein.

Figure 1:
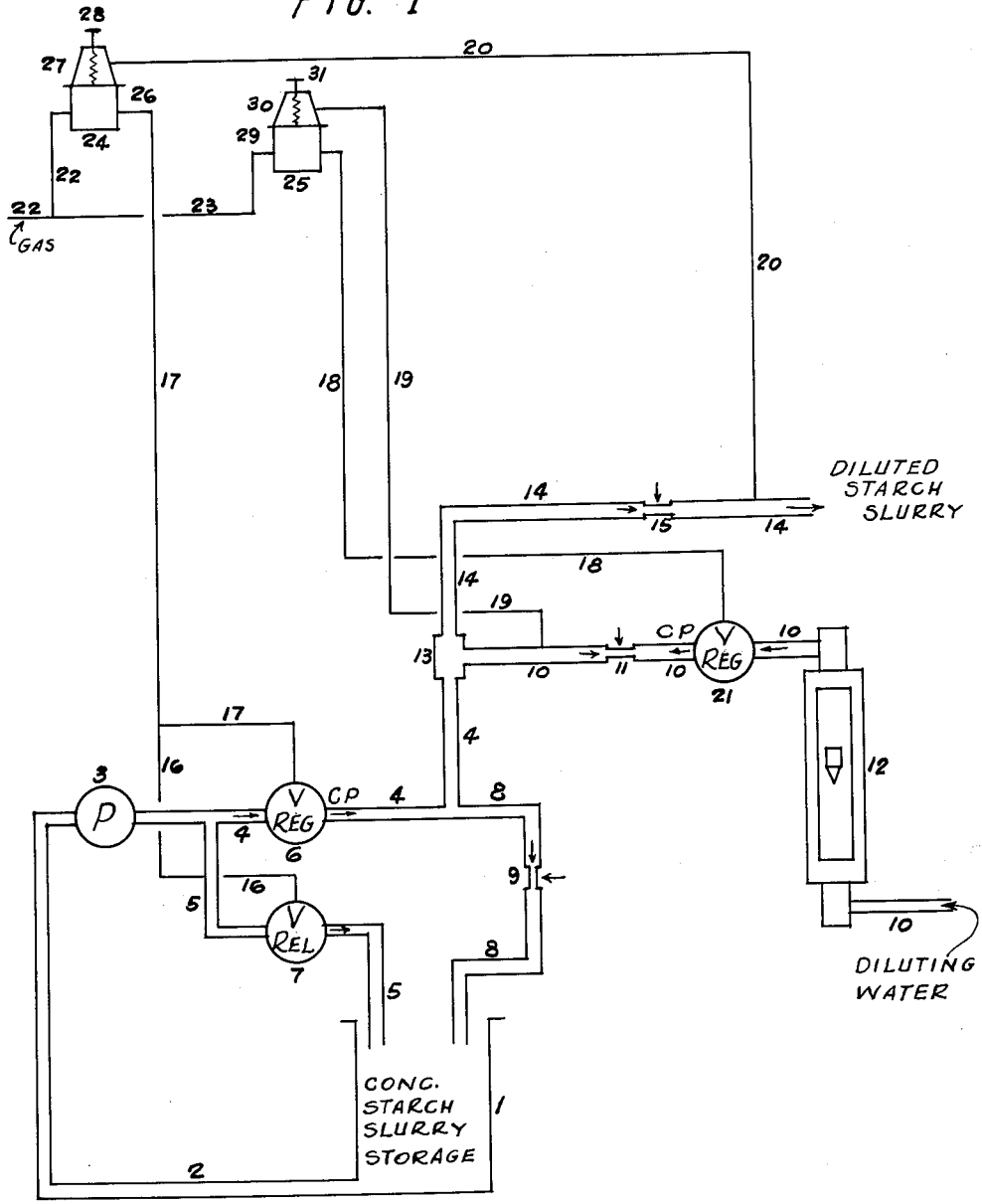
FIG. 1 is a diagrammatic sketch of hydraulic circuit diluting means constituting an embodiment of the invention.

In the present invention, and referring to FIG. 1 of the accompanying drawing, the flows of diluting liquid and concentrated liquid suspension of solid particles in the branches of the hydraulic diluting circuit are interchanged with respect to those of United States Patent 2,871,146. The concentrated suspension now flows through the branch containing the valve that regulates the discharge flow of diluted suspension, and the diluting liquid flows through the other branch where its flow is measured by a flowmeter. This interchange of flows eliminates all prior difficulty with the flowmeter at low flows due to settling out of solid particles from the concentrated suspension. Also, the present invention permits one to discharge a full range of solids in the diluted suspension, from zero to maximum value, by installing conduit means for recirculating the concentrated suspension through the valve that regulates the discharge flow. The flow of concentrated suspension into the diluting liquid at junction 13 can now be reduced to zero without creating difficulty at any point in the diluting circuit due to settling out or rising of solid particles in the concentrated suspension. It is to be noted that even though the concentrated starch slurry were recirculated through the flow regulating valve 61 in United States Patent 2,871,146, the recirculation could not include the adjoining flow restricting orifice 63 and hence could not prevent clogging of this orifice with settled out starch granules at low flows of concentrated starch slurry.

The above-discussed disadvantage of spring-loaded pressure regulating valves for regulating the liquid flows in the branches of the diluting circuit is overcome in the present invention by replacing the spring loading with gas pressure loading. The required gas pressure loading may be obtained conveniently from a conventional gas pilot pressure regulator whose output pressure is the sum of a selected circuit back pressure and a selected constant pressure augmenting the back pressure, but independent thereof. An example of a suitable gas pressure regulator for supplying the required gas pressure loading for the liquid flow regulating valves is shown diagrammatically in FIG. 3 of the accompanying drawings. It is a simple spring-loaded gas pilot pressure regulator whose output pressure, delivered through conduit 17, is the sum of the pressure from spring 28 and the back pressure communicated through conduit 20, both supplied to the upper side of diaphragm 26. The performance of this gas pressure regulator, as respects constancy of augmenting or biasing pressure at a given setting of the spring over working ranges of back pressure and fluctuations of input gas pressure, can be improved by replacing the spring loading with several known alternative devices. One alternative is to replace the spring loading with the output pressure of an auxiliary gas pressure regulator set to deliver the desired pressure to the former. Another is to replace the simple spring-loaded gas pressure regulator with a nullmatic gas pressure regulator, e.g., Model 40–A or 41–A made by Moore Products Company of Philadelphia, Pennsylvania.

Figure 3:
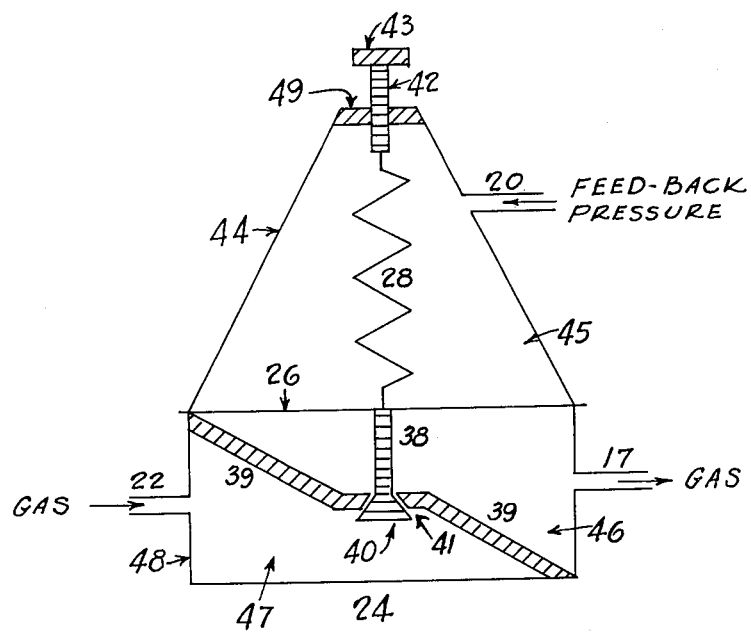
FIG. 3 is a diagrammatic vertical sectional view of one of the two similar gas pressure regulating valves 24 and 25 constituting elements of the hydraulic circuit shown in FIG. 1.

The operating principle of the gas pressure regulator shown in FIG. 3 is as follows: Valve member 40 "floats" in valve seat 41 located in rigid partition 39 to maintain a pressure in chamber 46 (and in output conduit 17) equal to the sum of the back pressure delivered to chamber 45 through conduit 20 and the biasing pressure from spring 28. Any unbalance of pressure across flexible diaphragm 26 causes the latter to move and either increase or decrease the clearance between valve member 40 (attached to diaphragm 26 with stem 38) and valve seat 41. A decrease in chamber 46 pressure or increase in feed-back pressure through conduit 20, causes the diaphragm to move toward the valve seat 41, to increase the clearance, and thus to restore the balance by admitting more gas to chamber 46 from chamber 47 containing gas supplied under suitably high pressure from input conduit 22. Conversely, an increase in chamber 46 pressure, or a decrease in feed-back pressure through conduit 20 causes the diaphragm to move away from valve seat 41, to decrease the clearance, and thus restore the balance by pinching off the flow of gas into chamber 46. The important characteristic of this gas pressure regulator, with feed-back as shown, is that the pressure maintained in output conduit 17 is always the sum of the spring pressure (distributed over the diaphragm area) and the feed-back pressure from conduit 20.

The gas pressure regulator shown in FIG. 3 is three-chambered. The chamber that receives the back pressure is bounded by rigid bonnet 44 and flexible diaphragm 26. The inlet or input gas chamber is bounded by rigid wall 48 and rigid partition 39, the latter being perforated by valve seat 41. The outlet or output gas chamber is also bounded (as shown) by rigid wall 48 and rigid partition 39. Compression spring 28 is attached at one end to diaphragm 26 and at the other end to threaded stem 42 which penetrates threaded portion 49 of bonnet 44 and terminates in knob 43. Threaded stem 42 is engaged by gas tight threads in the threaded part 49 of the bonnet. Pressure applied to the diaphragm by the spring can be changed by turning knob 43.

Additional advantages of loading the fluid flow control valves 6 and 21 with gas pressure instead of spring pressure are (1) the fluid flow control valves are conveniently opened and closed by opening and closing, respectively, the pilot or input gas pressure to the gas pressure regulators 24 and 25, respectively, and (2) desirable transient effects in the opening and closing of the fluid flow control valves are obtained by use of suitable check valves and restrictions in the conduits of the gas pressure regulators.

An example of use of the improved hydraulic diluting circuit according to the method of this invention will now be described in detail. This example is based on the dilution of a concentrated starch-water slurry with water and delivering a constant flow of diluted slurry to a continuous starch cooker or paster such as described in United States Patent 2,871,146.

Figure 2:
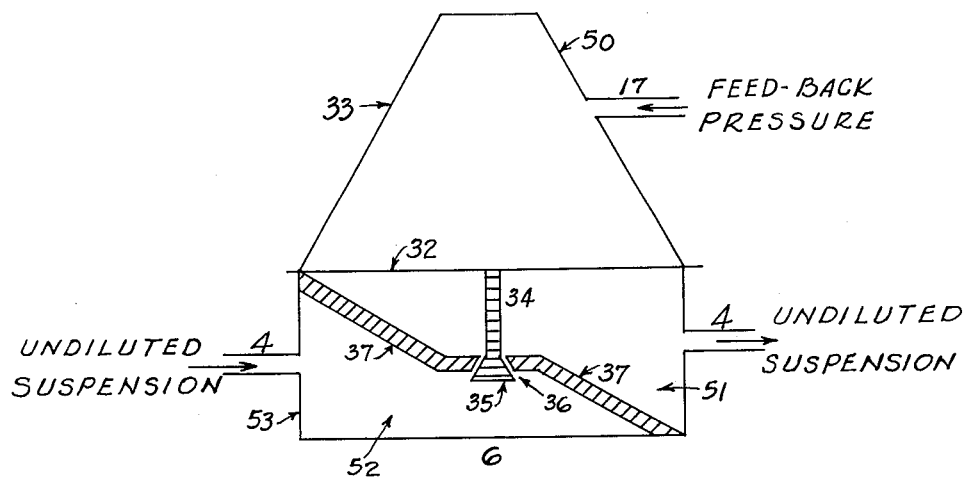
FIG. 2 is a diagrammatic vertical sectional view of one of the two similar pressure regulating and flow control valves 6 and 21 constituting elements of the hydraulic circuit shown in FIG. 1.

A quantity of 35% solids by weight of starch-water slurry is prepared by mixing four parts by weight of 12% moisture corn starch with six parts by weight of cold water in storage tank 1 of FIG. 1 in the accompanying drawing. The slurry is maintained as a uniform suspension of starch granules in water by agitation with a stirrer not shown in the drawing. The slurry is fed under pressure into conduits 4 and 5, which branch from conduit 2, by means of pump 3 in conduit 2. Reference numeral 6 designates a liquid pressure regulator disposed in conduit 4. The details of pressure regulator 6 are shown in FIG. 2 of the accompanying drawing. Reference numeral 7 designates a conventional pressure relief valve disposed in conduit 5. Pressure regulator 6 operates to maintain a liquid pressure in conduit 4 equal to the gas pressure delivered to its bonnet (reference numeral 33 in FIG. 2) from gas pressure regulator 24 by way of gas conduit 17. The delivered gas-pressure is the sum of the feed-back pressure from conduit 20 and the spring pressure supplied by spring 28. The pressure relief valve 7 opens when the liquid pressure in conduit 5 exceeds by a selected amount the gas pressure delivered to its bonnet by gas conduits 16 and 17, the same gas pressure delivered to the bonnet of valve 6. Reference number 9 designates a restriction in conduit 8, which conduit branches from conduit 4 at a point between valve 6 and its junction 13 with conduit 10. Conduit 8 leads back to the concentrated starch slurry storage tank 1. Pump 3 is a high capacity pump capable of maintaining the desired pressure and flow in conduit 4 despite the recirculation flow through conduit 8. It will be seen that the pump 3 may operate continuously, recirculating the concentrated starch slurry through relief valve 7 when pressure regulating valve 6 is closed, and recirculating the concentrated starch slurry through conduit 8 when valve 6 is open and little or no concentrated slurry is permitted to flow into junction 13.

The operating principle of the liquid pressure regulator shown in FIG. 2 is essentially the same as that of the gas pressure regulator shown in FIG. 3. Valve member 35 "floats" in valve seat 36 to maintain a liquid pressure in chamber 51 (and in conduit 4) equal to the gas pressure in chamber 50 supplied through conduit 17 from gas pressure regulator 24 (FIG. 1). Any unbalance of pressure across the flexible diaphragm 32 causes the valve member 35 (attached to the diaphragm by means of stem 34) to move to restore the pressure balance. It will be noted that the pressure maintained in conduit 4 is the sum of the spring pressure and the feed-back pressure applied to the diaphragm of gas pressure regulator 24.

Since the pressure drop across restriction 15 in conduit 14 is substantially the difference between the feed-back pressure in conduit 20 and the pressure maintained in conduit 4, it is evident that the pressure drop is equal to, and determined by, the spring pressure applied to the diaphragm of gas pressure regulator 24. From similar considerations, it is evident that the flow of water through conduit 10 is determined by the pressure drop across restriction 11, the latter being the spring pressure applied to the diaphragm of gas pressure regulator 25. The flow of water through conduit 10 into junction 13 is constant for a given combination of restriction 11 and spring pressure in regulator 25, and is conveniently altered by changing the spring pressure.

Gas pressure regulator 25 cooperates with liquid pressure regulator 21 in similar manner to make the pressure drop across restriction 11 in conduit 10 equal to the spring pressure applied to the diaphragm of regulator 25.

Conduit 10 containing liquid pressure regulator 21, flowmeter 12, and adjustable flow restriction 11, connects conduit 4 at junction 13 with a source of cold water under suitably high pressure.

Conduit 14 containing flow restriction 15 leads away from the junction of conduits 4 and 10 to a continuous starch paster or cooker such as that described in United States Patent 2,871,146.

Reference numeral 18 designates a gas conduit communicating between the bonnet of liquid pressure regulating valve 21 and the outlet port of gas pressure regulator 25. Reference numeral 19 designates a conduit communicating between the bonnet of pressure regulator 25 and conduit 10 at a point between restriction 11 and junction 13. Reference numeral 20 designates a conduit communicating between the bonnet of gas pressure regulator 24 and conduit 14 downstream from restriction 15. Reference numeral 22 designates a gas conduit connecting the inlet port of pressure regulator 24 with a source of gas under sufficient pressure to meet the output pressure needs of both gas pressure regulators, 24 and 25. Reference numeral 23 designates a gas conduit connecting the inlet port of pressure regulator 25 with gas conduit 22.

The hydraulic circuit means shown schematically in FIG. 1 will dilute a concentrated starch slurry as desired and deliver a selected constant flow of the diluted slurry to a starch cooker, for example. Also, it will perform this function without leading to prior art difficulties due to settling out of starch granules from a slowly moving starch slurry. The flow of diluted slurry to the cooker is determined by the combination of restriction 15 in conduit 14 and the pressure drop across the restriction, i.e., the spring pressure applied to the diaphragm of gas pressure regulator 24. As previously mentioned, the spring pressure may be replaced with a gas pressure loading, the latter being communicated mechanically to the main diaphragm of pressure regulator 24 from an auxiliary diaphragm.

The flow of starch slurry through conduit 14 for a given combination of restriction 15 and augmenting pressure on the diaphragm of gas pressure regulator 24, will remain constant except for slight changes in viscosity or friction coefficient of the slurry due to changes in its temperature or starch content. For practical purposes, these slight changes may be ignored.

The discharge flow of diluted starch slurry may be conveniently determined at a given combination of restriction 15 and biasing pressure applied to gas pressure regulator 24 as follows: Set the diluting water flow equal to the total flow in conduit 14. This is done by increasing the pressure (or flow) in conduit 10 by increasing the spring pressure of gas pressure regulator 25 until the slurry flow into junction 13 vanishes, as indicated by the discharge of clear water. The flow in conduit 14 is then shown by flowmeter 12. The flow of diluting liquid is then reduced by reducing the biasing pressure on gas pressure regulator 25 without disturbing the flow in conduit 14, i.e., without changing the biasing pressure on gas pressure regulator 24. This permits concentrated starch slurry from conduit 4 to mingle with diluting water at junction 13 and yield a flow of diluted starch slurry in conduit 14. Knowing the flow in conduit 14 for a given combination of restriction 15 and biasing pressure for gas pressure regulator 24, the concentration of starch in the diluted slurry is easily calculated from the diluting water flow (as shown by flowmeter 12) and the starch concentration in the undiluted slurry by the following equation $$S_2 = S_1 \left( \frac{F_1 - F_2}{F} \right)$$

where $S_2$ is the starch concentration in the diluted slurry, $S_1$ is the starch concentration in the undiluted slurry, $F_2$ is the diluting water flow, and $F_1$ is the diluted slurry flow. $S_2$ equals $S_1$ when $F_2$ is zero, and $S_2$ is zero when $F_2$ equals $F_1$. Also, the volume fractions of diluting water and undiluted starch slurry in the diluted slurry may be calculated from the equation $$V_2/V_1 = \frac{F_2}{F_1 - F_2}$$

where $V_2$ is the volume fraction of diluting water, $V_1$ is the volume fraction of undiluted slurry, $F_2$ is the measured reduced flow of diluting water and $F_1$ is the known flow of diluted slurry (the same as the measured flow of diluting water at zero flow of undiluted starch slurry into junction 13). This equation follows from the inherent relationships:

(1) $\qquad V_1 + V_2 = 1$ (2) $\qquad F_1 = F_2/V_2$

From Equation 2:
$$V_2 = F_2/F_1$$

From Equation 1:
$$V_1 = 1 - V_2 = \frac{F_1 - F_2}{F_1}$$

Therefore:
$$V_2/V_1 = F_2/F_1 \div \frac{F_1 - F_2}{F_1} = \frac{F_2}{F_1 - F_2}$$

The present invention is applicable to all liquid suspensions of solid particles, i.e., suspensions of solid particles in homogeneous liquids. The suspending liquid medium need not be a pure liquid such as water or ethanol. For example, it may be a solution of a solid in a liquid, a mixture of two or more mutually miscible liquids, a stable emulsion of immiscible liquids, or a stable colloidal solution of a solid in a liquid.

In summary, the present invention is based on the following elements:

(1) flow of concentrated suspension through the pressure regulating valve which regulates the flow of diluted suspension;
(2) gas pilot loading of the liquid pressure regulating valves in the branches of the diluting circuit; and
(3) conduit means for recirculating concentrated suspension through the pressure regulating valve which regulates the flow of diluted suspension.

The method aspect of the invention is regarded broadly as an interchange of flows in the two inlet branches of the hydraulic diluting circuit disclosed in United States Patent 2,871,146 coupled with means to recirculate the undiluted suspension through the flow control valve which regulates the flow of diluted suspension. The apparatus aspect of the invention is regarded broadly as the hydraulic diluting circuit disclosed in United States Patent 2,871,146 improved by replacing the spring loading of the two flow control valves with air loading and by adding conduit means providing recirculation of undiluted suspension through the flow control valve which regulates the flow of diluted suspension.

It is to be noted that when the diluted suspension is discharged at constant pressure, as may be desired or obtained at times, it is unnecessary to feed the discharge pressure back to the liquid flow control valve which regulates the flow of diluted suspension. The desired regulation can be obtained by independent gas pressure loading of the liquid flow control valve. Specifically, conduit 20 in FIG. 1 can be eliminated when the discharge pressure is constant.

I claim:

1. The method of diluting a liquid suspension of solid particles with a selected volume ratio of diluting liquid and providing a constant flow of diluted suspension that comprises (1) recirculating the liquid suspension under pressure in a first conduit containing a first diaphragm-type pressure regulating liquid flow control valve and a flow restriction downstream from said valve, (2) conveying diluting liquid under pressure in a second conduit containing a second diaphragm-type pressure regulating liquid flow control valve and two flow restrictions in series downstream from said second valve, (3) adjusting the flow rates and hence the pressures in the two conduits to non-zero values so that no liquid flow occurs in a third conduit joining the first conduit between the valve and flow restriction therein and joining the second conduit between the two flow restrictions therein, (4) sensing the pressure in the second conduit downstream from the farther downstream flow restriction therein, (5) applying a pressure to the non-liquid-suspension side of the diaphragm in the first liquid flow control valve which is the sum of the sensed pressure and a selectable constant first biasing pressure independent of the sensed pressure, whereby the pressure drop across said farther-downstream flow restriction is equal to the first biasing pressure and provides a constant liquid flow through said flow restriction despite variations in the sensed pressure, (6) sensing the pressure in the second conduit between its junction with the third conduit and the flow restriction farther upstream therein, (7) applying a pressure to the non-diluting-liquid side of the diaphragm in the second liquid flow control valve which is the sum of the sensed pressure and a selectable constant second biasing pressure independent of the sensed pressure, whereby the pressure drop across said farther-upstream flow restriction is equal to the second biasing pessure and provides a constant flow of diluting liquid through said flow restriction despite variations of pressure in the second conduit between its two flow restrictions, (8) measuring the flow rate of diluting liquid discharge from the second conduit, (9) decreasing the second biasing pressure to a selected constant value without changing the first biasing pressure, thus obtaining an increased flow of liquid suspension in the third conduit and a reduced flow of diluting liquid in the second conduit, the sum of which flows is the same as said measured flow of diluting liquid at zero flow in the third conduit, (10) measuring said reduced flow of diluting liquid, the ratio of the volume of diluting liquid to volume of said liquid suspension being given by the equation $$\frac{V_2}{V_1}=\frac{F_2}{F_1-F_2}$$

where $V_2$ is the volume fraction of diluting liquid, $V_1$ is the volume fraction of liquid suspension, $F_2$ is the measured reduced flow of diluting liquid and $F_1$ is the measured flow rate of diluting liquid when no flow occurs in the third conduit at non-zero first and second biasing pressures.

2. The method according to claim 1 wherein (1) the pressure in the second conduit downstream from the farther-downstream flow restriction therein is transmitted to the loaded side of the diaphragm of a first diaphragm-type gas pressure regulating valve, said diaphragm being loaded with a selectable constant first biasing pressure independent of the transmitted pressure, whereby the regulated gas pressure is the sum of the transmitted pressure and the biasing pressure, (2) said regulating gas pressure is transmitted to the non-liquid-suspension side of the diaphragm in the first liquid flow control valve, (3) the pressure in the second conduit between the two flow restrictions therein is transmitted to the loaded side of the diaphragm of a second diaphragm-type gas pressure regulating valve, said diaphragm being loaded with a selectable constant second biasing pressure independent of the transmitted pressure, whereby the regulated gas pressure is the sum of the transmitted pressure and the second biasing pressure, and (4) the regulated gas pressure from the second gas pressure regulating valve is transmitted to the non-diluting-liquid side of the diaphragm in the second liquid flow control valve.

References Cited in the file of this patent

UNITED STATES PATENTS

| | | |
|---|---|---|
| 1,806,904 | Johnson | May 26, 1931 |
| 1,936,538 | Borden | Nov. 21, 1933 |
| 2,626,627 | Jung | Jan. 27, 1953 |
| 2,800,915 | Tavener | July 30, 1957 |
| 2,837,102 | Bauer | June 3, 1958 |
| 2,871,146 | Etheridge | Jan. 27, 1959 |

UNITED STATES PATENT OFFICE
CERTIFICATE OF CORRECTION

Patent No. 3,039,479                             June 19, 1962

Oliver R. Etheridge

It is hereby certified that error appears in the above numbered patent requiring correction and that the said Letters Patent should read as corrected below.

Column 5, lines 68 to 70, the equation should appear as shown below instead of as in the patent:

$$S_2 = S_1 \left( \frac{F_1 - F_2}{F_1} \right)$$

column 7, line 29, for "pessure" read -- pressure --.

Signed and sealed this 10th day of December 1963.

SEAL)
Attest:
ERNEST W. SWIDER

Attesting Officer

EDWIN L. REYNOLDS

Acting Commissioner of Patents